United States Patent
Kackstetter

(10) Patent No.: US 11,486,516 B2
(45) Date of Patent: Nov. 1, 2022

(54) CONCRETE PUMP HOSE SUPPORT

(71) Applicant: Earth Tek Construction Inc., Solana Beach, CA (US)

(72) Inventor: Cy Richard Kackstetter, Fallbrook, CA (US)

(*) Notice: Subject to any disclaimer, the term of this patent is extended or adjusted under 35 U.S.C. 154(b) by 0 days.

(21) Appl. No.: 15/907,424

(22) Filed: Feb. 28, 2018

(65) Prior Publication Data

US 2019/0264835 A1    Aug. 29, 2019

(51) Int. Cl.
*F16L 3/02* (2006.01)
*E04G 21/02* (2006.01)

(52) U.S. Cl.
CPC ............... *F16L 3/02* (2013.01); *E04G 21/02* (2013.01)

(58) Field of Classification Search
CPC ... F16L 3/02; F16L 3/26; F16L 3/1218; E04G 21/02; E04C 5/18
USPC ..... 248/83, 105, 37.3; 52/677, 684, 687, 88, 52/86
See application file for complete search history.

(56) References Cited

U.S. PATENT DOCUMENTS

| | | | | |
|---|---|---|---|---|
| 154,980 A * | 9/1874 | Farrier | .................. | B05B 15/063 248/80 |
| 497,878 A * | 5/1893 | Higham | .................. | B65G 65/24 248/143 |
| 550,669 A * | 12/1895 | Wright | ...................... | E04C 5/18 52/689 |
| 924,090 A * | 6/1909 | Moore | ...................... | E04C 5/18 52/649.8 |
| 1,058,908 A * | 4/1913 | Schoenthaler | ............ | E04C 5/18 52/687 |
| 1,060,919 A * | 5/1913 | Luten | ........................ | E04C 5/18 52/684 |
| 1,123,107 A * | 12/1914 | Darr | .......................... | E04C 5/18 52/684 |
| 1,254,853 A * | 1/1918 | Schoenthaler | ............ | E04C 5/18 52/684 |
| 1,260,494 A * | 3/1918 | Widmer | .................... | E04C 5/18 52/689 |
| 1,449,855 A * | 3/1923 | Foster | ....................... | E04C 5/18 52/649.4 |
| 1,584,216 A * | 5/1926 | Coates | ....................... | E04C 5/18 52/684 |
| 1,911,957 A * | 5/1933 | Kassmir | .................... | E04C 5/18 52/687 |

(Continued)

FOREIGN PATENT DOCUMENTS

| | | | | |
|---|---|---|---|---|
| CH | 676866 | A5 * | 3/1991 | ............... E04C 5/18 |
| CH | 683933 | A5 * | 6/1994 | ............... E04C 5/16 |

(Continued)

*Primary Examiner* — Kimberly T Wood
(74) *Attorney, Agent, or Firm* — Sunstein LLP

(57) ABSTRACT

A hose support includes: a body defining at least one concave surface configured to receive a concrete slurry hose, the body including at least one support surface configured to rest on pavement; where the at least one concave surface is displaced from the at least one support surface to support the concrete slurry hose above the pavement; and where: the at least one concave surface is configured to slidably receive the concrete slurry hose; or the at least one support surface is configured to slidably rest on the pavement while the body receives the concrete slurry hose; or a combination thereof.

7 Claims, 7 Drawing Sheets

(56) References Cited

U.S. PATENT DOCUMENTS

| | | | | |
|---|---|---|---|---|
| 2,033,296 A * | 3/1936 | Porter | A61J 9/0638 | 248/102 |
| 2,374,442 A * | 4/1945 | Richard | A24F 19/0042 | 131/256 |
| 2,439,581 A * | 4/1948 | Robins | | 280/35 |
| 2,905,743 A * | 9/1959 | Sylvester | H01B 17/16 | 174/73.1 |
| 2,910,304 A * | 10/1959 | Caylor | B62B 1/264 | 280/47.131 |
| 2,937,833 A * | 5/1960 | Sachs | F16L 3/2235 | 248/49 |
| 2,955,790 A * | 10/1960 | Sylvester | H02G 5/025 | 248/65 |
| 3,276,181 A * | 10/1966 | Gilbert | E04C 5/203 | 52/633 |
| 3,382,986 A * | 5/1968 | Pfeiffer | A24F 9/14 | 211/70.1 |
| 3,387,423 A * | 6/1968 | Andreas | E04C 5/20 | 52/678 |
| D292,861 S * | 11/1987 | Dorper | | 248/37.3 |
| 4,799,636 A * | 1/1989 | Johnson | A61J 9/0684 | 248/102 |
| 4,834,328 A * | 5/1989 | Hall | A47G 21/14 | 248/174 |
| 5,107,654 A * | 4/1992 | Leonardis | E04C 5/20 | 52/677 |
| 5,555,693 A * | 9/1996 | Sorkin | E04C 5/20 | 404/135 |
| 5,598,682 A * | 2/1997 | Haughian | F24D 3/141 | 52/745.21 |
| D394,200 S * | 5/1998 | Hartzheim | | D8/354 |
| 5,875,943 A * | 3/1999 | Frandsen, Sr. | B60R 5/00 | 211/85.7 |
| D448,978 S * | 10/2001 | Isbell | | D7/619.1 |
| D451,611 S * | 12/2001 | Pontarolo | | D25/119 |
| 6,327,822 B1 * | 12/2001 | Il Grande | E04B 5/48 | 52/577 |
| D465,304 S * | 11/2002 | Bushman | | D28/73 |
| 6,517,873 B1 * | 2/2003 | Furuna | A22C 29/02 | 426/6 |
| 6,644,604 B1 * | 11/2003 | Young | A63B 55/57 | 248/96 |
| 6,648,281 B1 * | 11/2003 | Lake | A62C 33/06 | 248/49 |
| D500,668 S * | 1/2005 | Kelly | | D8/354 |
| D515,878 S * | 2/2006 | Czepowicz | | D7/619.1 |
| 7,143,563 B1 * | 12/2006 | Palmer | E04C 5/168 | 52/677 |
| 7,216,837 B2 * | 5/2007 | Pineda | A47G 7/025 | 248/104 |
| D565,389 S * | 4/2008 | Harmon | | D8/356 |
| D579,278 S * | 10/2008 | Umnitz | | D7/637 |
| 7,434,771 B1 * | 10/2008 | Tai | F16L 3/00 | 138/106 |
| 8,603,332 B2 * | 12/2013 | Brooks | E03F 1/002 | 138/105 |
| 8,668,171 B2 * | 3/2014 | Tarantino | A47G 21/14 | 220/500 |
| 8,763,960 B1 * | 7/2014 | Moore | B21D 5/00 | 248/65 |
| 8,800,240 B1 * | 8/2014 | Solis | E04C 5/20 | 52/686 |
| 8,910,803 B2 * | 12/2014 | Holtby | F16L 1/0246 | 211/126.1 |
| D721,930 S * | 2/2015 | Dohy | | D7/708 |
| 8,944,445 B2 | 2/2015 | Cook et al. | | |
| 8,985,529 B2 * | 3/2015 | Masters | F16L 3/223 | 248/176.1 |
| D779,271 S * | 2/2017 | Simon | | D7/504 |
| D831,785 S * | 10/2018 | Atwell | | D23/209 |
| 10,533,685 B2 * | 1/2020 | Blundell | F16L 3/02 | |
| 2004/0261352 A1 * | 12/2004 | Bennett | E04C 5/20 | 52/698 |
| 2013/0037660 A1 * | 2/2013 | Tarantino | A47G 21/14 | 248/37.3 |

FOREIGN PATENT DOCUMENTS

| | | | | |
|---|---|---|---|---|
| CH | 704643 A2 * | 9/2012 | | F16L 3/26 |
| DE | 1126113 B * | 3/1962 | | E04C 5/18 |
| DE | 2941796 A1 | 4/1981 | | E04C 5/18 |
| EP | 0398015 A1 * | 11/1990 | | A47G 23/0241 |
| GB | 556693 A * | 10/1943 | | F16L 3/02 |
| GB | 2158848 A * | 11/1985 | | E04C 5/20 |

* cited by examiner

CONCRETE PUMP HOSE SUPPORT

BACKGROUND

It is often desirable to deliver a liquid or a slurry, e.g., a concrete slurry, from one location to another. For example, it is often desirable to deliver a concrete slurry to a site that is not accessible by a concrete mixer truck and/or in a volume that does not warrant use of a concrete mixer truck. For such applications, a line pump (a.k.a., a trailer-mounted concrete pump or truck-mounted concrete pump) is typically used. For example, referring to FIG. 1, a concrete slurry delivery system 10 includes a line pump 12, a hose 14, and a truck 16. The line pump 12 is connected to the hose 14 and is configured to pump concrete slurry from a reservoir 18 of the line pump 12 through the hose 14 for delivery to a desired location, e.g., behind a house 20. The hose 14 is made of a durable material such as high tensile synthetic textile and/or wire (e.g., helix wire) reinforced rubber or fabric reinforced rubber. Other hose constructions may be used, and numerous manufacturers exist that produce hoses of various constructions. The hose 14 may have a configurable length, being made of multiple sections 22, 24, 26 that are joined together by flanges 28. The flanges 28 are typically made of steel, and extend outside a perimeter of the hose sections 22, 24, 26. While the line pump 12 is pumping the concrete slurry, the hose 14 typically moves in a back-and-forth motion along a length of the hose 14 due to the line pump 12 pushing the concrete slurry into the hose 14 in pulses.

SUMMARY

An example of a hose support includes: a body defining at least one concave surface configured to receive a concrete slurry hose, the body including at least one support surface configured to rest on pavement; where the at least one concave surface is displaced from the at least one support surface to support the concrete slurry hose above the pavement; and where: the at least one concave surface is configured to slidably receive the concrete slurry hose; or the at least one support surface is configured to slidably rest on the pavement while the body receives the concrete slurry hose; or a combination thereof.

Implementations of such a hose support may include one or more of the following features. The body includes end sections, each of the end sections includes at least a portion of a respective one of the at least one concave surface, where the body includes a midsection that includes an outer surface that is the at least one support surface, where the midsection connects the end sections, and where at least a portion of the outer surface is convex. The outer surface includes a concave portion configured to receive the concrete slurry hose. The body includes an inner surface of the end sections and the midsection, the inner surface defining a volume to receive tubular portions of the concrete slurry hose in the at least a portion of the at least one concave surface of each of the end sections and to receive a flange of the concrete slurry hose that extends outside of perimeters of the tubular portions of the concrete slurry hose. The body comprises a material with a hardness that is softer than a hardness of concrete. The body comprises an outer surface comprising a first portion that is convex and a second portion that comprises the at least one concave surface.

Another example of a hose support includes: a body comprising concave surfaces defining recesses to receive a tubular concrete slurry hose and configured to support the tubular concrete slurry hose, the body including support surfaces configured to rest on pavement; where the recesses include at least one first recess configured to receive the tubular concrete slurry hose with a first support surface of the support surfaces in contact with the pavement; and where the recesses include at least one second recess configured to receive the tubular concrete slurry hose with a second support surface of the support surfaces in contact with the pavement.

Implementations of such a hose support may include one or more of the following features. The at least one first recess is defined to receive the tubular concrete slurry hose with the first support surface of the support surfaces in contact with the pavement while the body is in a first orientation, and where the at least one second recess is defined to receive the tubular concrete slurry hose with the second support surface of the support surfaces in contact with the pavement while the body is in a second orientation that is rotated 180° about a horizontal axis relative to the first orientation. The concave surfaces have substantially arced shapes to slidably support the tubular concrete slurry hose. The body comprises an outer surface comprising a first portion having a convex, partially tubular shape, and a second portion comprising at least one of the concave surfaces.

Another example of a hose support includes: a body comprising: an arched portion with an outer surface that is curved along, and for at least a portion of, a length of the body, the arched portion extending across at least one portion of a width of the body; feet each with a bottom configured to rest on pavement; an upper support portion vertically displaced from the bottoms of the feet and defining a first recess that is concave, the upper support portion being configured to receive a first portion of a concrete slurry hose in the first recess with the bottoms of the feet resting on the pavement; and a lower support portion defining at least one second recess, each between respective ones of the feet, the lower support portion being configured to receive a second portion of the concrete slurry hose in the at least one second recess with the outer surface resting on the pavement.

Implementations of such a hose support may include one or more of the following features. The arched portion defines a third recess configured to receive a flange of the concrete slurry hose while the at least one second recess receives the second portion of the concrete slurry hose. The arched portion defines a third recess, the hose support is a first hose support, and the body is a first body configured to be stacked on, and nested with, a second body of a second hose support, that is shaped similarly to the first hose support, such that the arched portion of the second body will be at least partially received by the third recess of the first body. The first body is configured such that a convex inner surface of the upper support portion of the first body will be received by the first recess of the second body with the first body stacked on, and nested with, the second body. A top of the outer surface is disposed at a top of the body. Each of the feet is disposed at an end of the arched portion. A bottom of the first recess is parallel to a plane of the bottoms of the feet. The upper support portion is configured to slidably receive a first portion of a concrete slurry hose in the first recess. The body comprises a material with a hardness that is softer than a hardness of concrete. The body comprises high-density polypropylene.

DETAILED DESCRIPTION

Techniques are also discussed herein for supporting and elevating a hose, such as a concrete slurry hose, while in use. For example, a hose support may be configured to receive the concrete slurry hose and to slide over a surface such as the ground, asphalt, hardened concrete, brick, etc. The hose support may also or alternatively be configured to allow the hose to slide against the hose support while the hose is received by the hose support. The hose support may be configured to receive the hose in multiple locations. For example, the hose support may be reversible such that the hose support may receive the hose with the hose support in two different orientations, with the two orientations being flipped 180° relative to each other. These examples, however, are not exhaustive.

Items and/or techniques described herein may provide one or more of the following capabilities, as well as other capabilities not mentioned. A flange of a concrete slurry hose may be separated from a surface to be protected. A concrete slurry hose may be separated from surfaces and objects that may be damaged by contact with the concrete slurry hose while a concrete slurry is pumped through the hose. Strain on an operator of a concrete slurry hose fed by a pump may be reduced. Strain on a concrete pump due to "back kick" may be reduced. Other capabilities may be provided and not every implementation according to the disclosure must provide any, let alone all, of the capabilities discussed.

Figure 2:
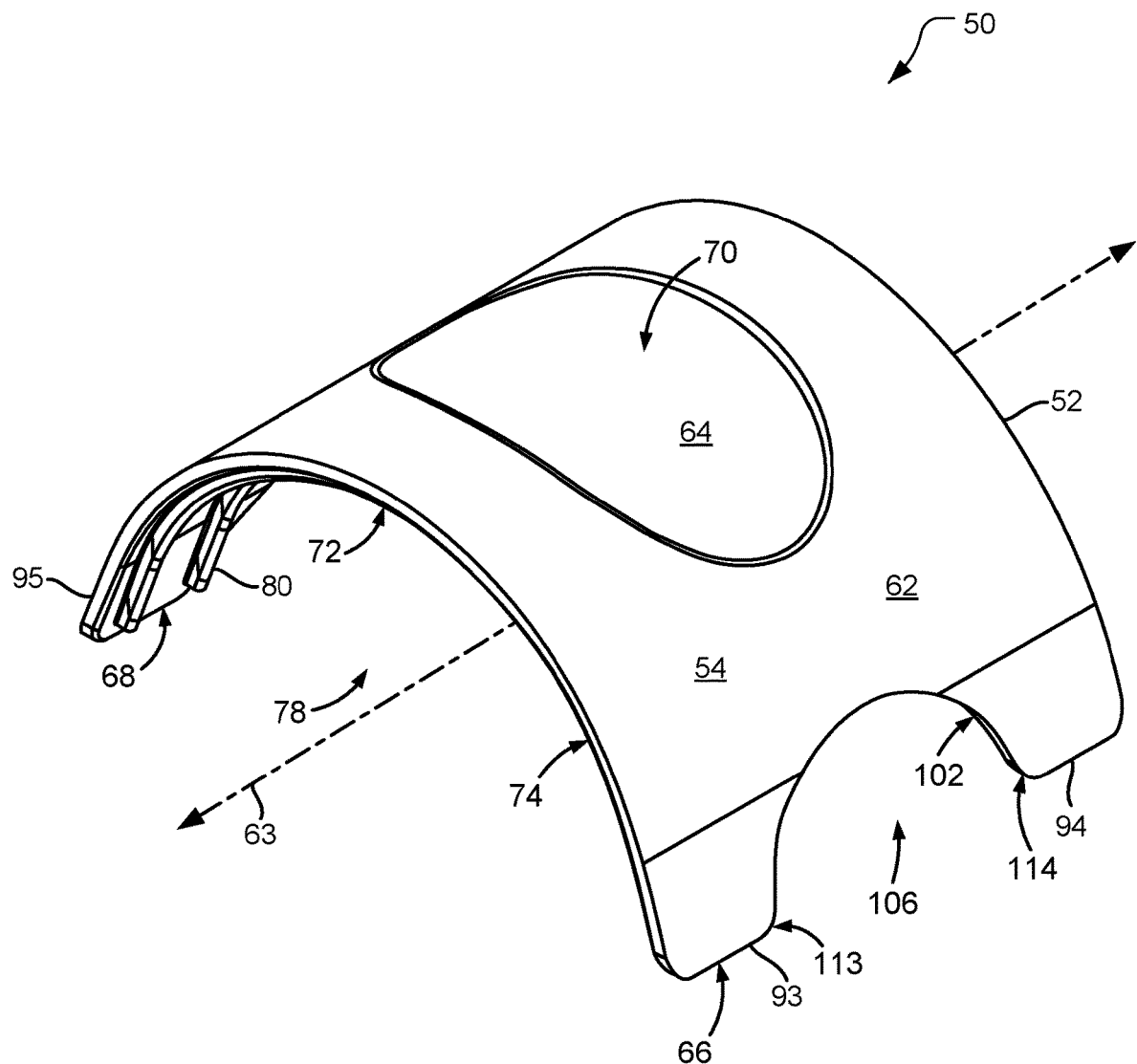
FIG. 2 is a perspective view of a hose support.
Figure 3:
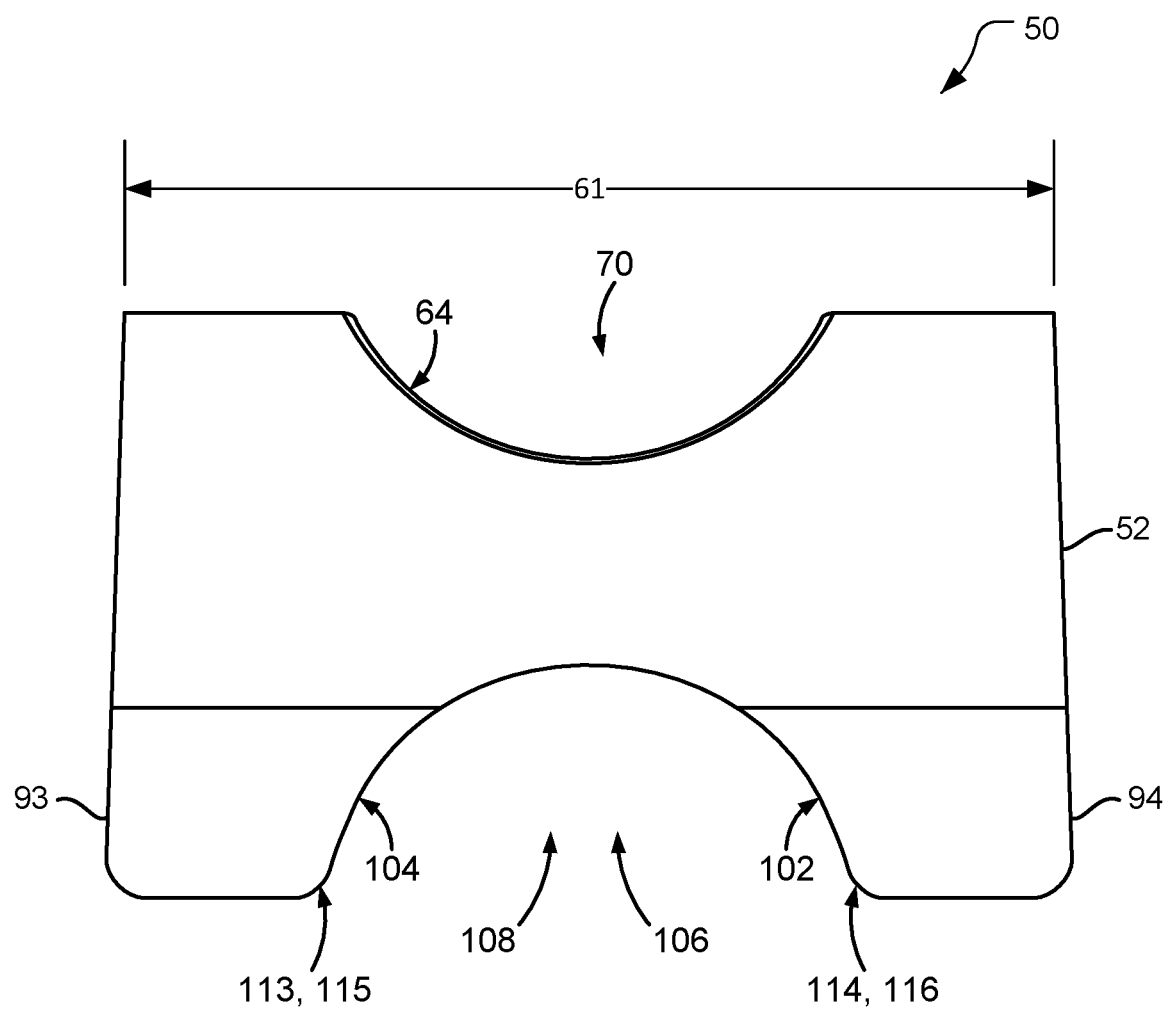
FIG. 3 is an end view of the hose support shown in FIG. 2.

Referring to FIG. 2, with further reference to FIGS. 3-8, a hose support 50 includes a body 52 that is sized and shaped to support a hose 51 (see FIGS. 6-7) away from a surface on which the hose support 50 rests. In this example, the hose support 50 is reversible such that the hose 51 may be supported in more than one orientation of the hose support 50. In particular, the hose support 50 may support the hose in orientations that are rotated 180° relative to each other. Thus, the hose support 50 may support the hose 51 in an upright orientation (FIG. 6) or in an upside down orientation (FIG. 7), although which orientation is labeled the upright orientation and which orientation is labeled the upside down orientation is arbitrary. As discussed more fully below, the hose support 50 is configured to support the hose 51, such as a tubular hose for transporting a concrete slurry, above the surface, and may accommodate (e.g., form a bridge over) different contours in, or objects on, the surface such as curbs, small walls, concrete forms, puddles, holes, and may also accommodate protuberances of the hose 51, such as flanges, that extend outside of perimeters of tubular portions of the hose 51. The hose support 50 may help prevent damage to such contours or objects, e.g., by shielding the contours/objects from the hose 51. A tubular hose will typically have a cylindrical shape, other than at connections between hose sections, and thus the hose support 50 may have circularly or nearly-circularly shaped concave surfaces for supporting the hose 51. Other hose shapes may, however, be supported, e.g., with circularly or nearly-circularly shaped concave surfaces or with non-circularly (non-radially) shaped concave surfaces of hose supports.

The body 52 includes an outer surface 54 that is configured to rest upon a surface, such as pavement or the ground, and to support the hose 51. For the discussion herein, it is assumed that the hose support 50 rests on pavement, but the description is applicable to other surfaces. The outer surface 54 is configured to rest upon and slide over the pavement, i.e., to slidably rest on the pavement. Here, the outer surface 54 has a convex shape over at least a portion of the outer surface 54 to facilitate slidably resting on the pavement.

The body 52 includes a midsection 58 (see FIG. 4) that may be configured, e.g., shaped, to slidably rest on the pavement and/or to guard against damaging the pavement due to movement across the pavement while supporting the hose 51. The midsection 58 has a first outer surface portion 62 that is curved along, and for at least a portion of, a length 65, from an end 66 to an end 68, of the body 52. The first outer surface portion 62 is arched, having a convex shape, curving outwardly, although other shapes may be used (e.g., a flat portion with rounded convex ends, an arched (convex) portion with flat portions extending from either end of the arched portion, etc.). The arched portion extends across at least one portion of a width 61 (FIG. 3) of the body 52, and for a height 81 that is a majority of a height 83 of the body 12. Further, the midsection 58 may have a shape that varies, e.g., with the first outer surface portion 62 having a circular curve (cylindrical shape) over part of a length 67, including a midpoint 69 of the length 65, of the midsection 58 and one or more other shapes for one or more other parts of the midsection 58. The first outer surface portion 62 of the midsection 58 is partially tubular, extending parallel to an axis 63 transverse to the length 65 of the body 52 while not forming a complete loop, i.e., without ends of the first outer surface portion 62 touching each other. The first outer surface portion 62 is a support surface that may be rested on the pavement (see FIG. 7), and may help the hose support 50 rock back and forth and/or slide relative to the pavement with movement of the hose 51 while the hose 51 is received in a bottom of the hose support 50 as discussed below.

The midsection 58 also has a second outer surface portion 64 that is a concave surface, extending inwardly, that defines a recess 70 for receiving the hose 51. The second outer surface portion 64 is configured, e.g., sized, shaped, and of a material, to slidably receive the hose 51 (see FIG. 6). Further, the second outer surface portion 64 may comprise a material and may have a smoothness such that a coefficient of friction permits sliding of the hose 51 relative to the second outer surface portion 64, e.g., with the hose support 50 resting on pavement. The hose 51 can slide in the recess 70 against the second outer surface portion 64 and/or the hose support 50 can slide against the pavement such that the hose support 50 absorbs some energy during movement of the hose 51 (e.g., due to friction between the hose 51 and the hose support 50 and/or due to friction between the hose support 50 and the pavement). Absorbing this energy may reduce movement of the hose 51, which may in turn benefit an operator at the end of the hose 51, e.g., reduce strain of operation. Reducing movement of the hose 51 may also or alternatively reduce "back kick" on the pump.

Figure 6:
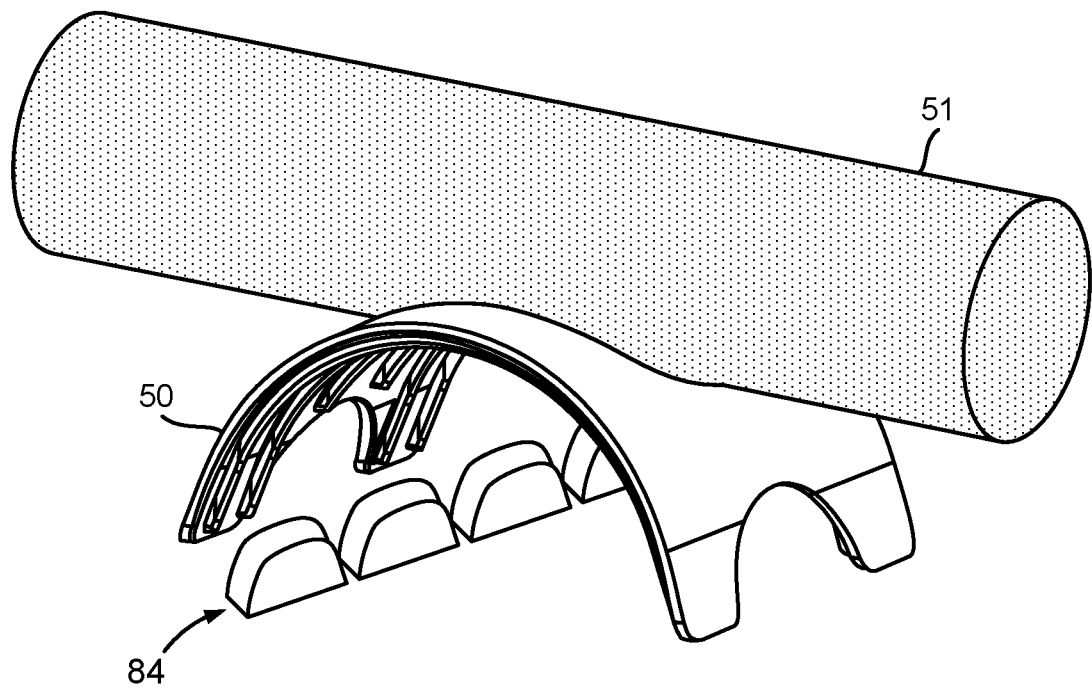
FIG. 6 is a perspective view of the hose support, shown in FIG. 2, in one orientation supporting a hose.

The second outer surface portion 64 is also configured to inhibit lateral movement of the hose 51 to help keep the hose 51 in the recess 70. For example, the second outer surface portion 64 may have a shape and size similar to a cross-sectional shape and size of the hose 51. Here, for example, the second outer surface portion 64 has a substantially arced shape, being circular or nearly circular in shape (e.g., a cross-section of the portion 64 being within ±10% of a single radius). Alternatively, the second outer surface portion 64 may have a circular center portion and flared end portions (as with concave surfaces discussed below). A circular portion of the second outer surface portion 64 may have a slightly larger radius than a radius of the hose 51 to facilitate sliding of the hose 51 in the recess 70 while also retaining the hose 51 in the recess 70 to help the hose support 50 continue to support the hose 51 during use of the hose 51 to convey material. For example, the circular portion of the second outer surface portion 64 may have a radius of 2.25 inches to receive the hose 51, examples of which may have an outer radius of about 1.4 inches or about 2 inches. The recess 70 may receive the hose 51 without receiving the entire hose 51, i.e., the recess 70 need not be as deep as the hose 51 is tall. As shown in FIG. 6, a deepest point of the recess 70 may receive about a fourth of a height of the hose 51.

The hose support 50 may inhibit lateral motion of the hose support 50, e.g., due to motion of the hose 51. If the hose 51 slides relative to the hose support 50, then less motion of the hose support 50 relative to the pavement may be induced. As the hose support 50 slides relative to the pavement, the hose support 50 may be subject to lateral motion, e.g., due to a gradient of the pavement. The hose support 50 may inhibit such lateral motion, e.g., due to the shape, texture, and/or material of the hose support 50 providing friction between the hose support 50 and the pavement.

The second outer surface portion 64 of the midsection 58 is, here, a contiguous surface, being a portion of a cylinder, and thus providing the single recess 70. Other configurations, however, may be used. For example, multiple separate concave surfaces (e.g., strips) may be separated from each other and provide multiple recesses for receiving the hose 51, i.e., respective portions of the hose 51.

Figure 4:
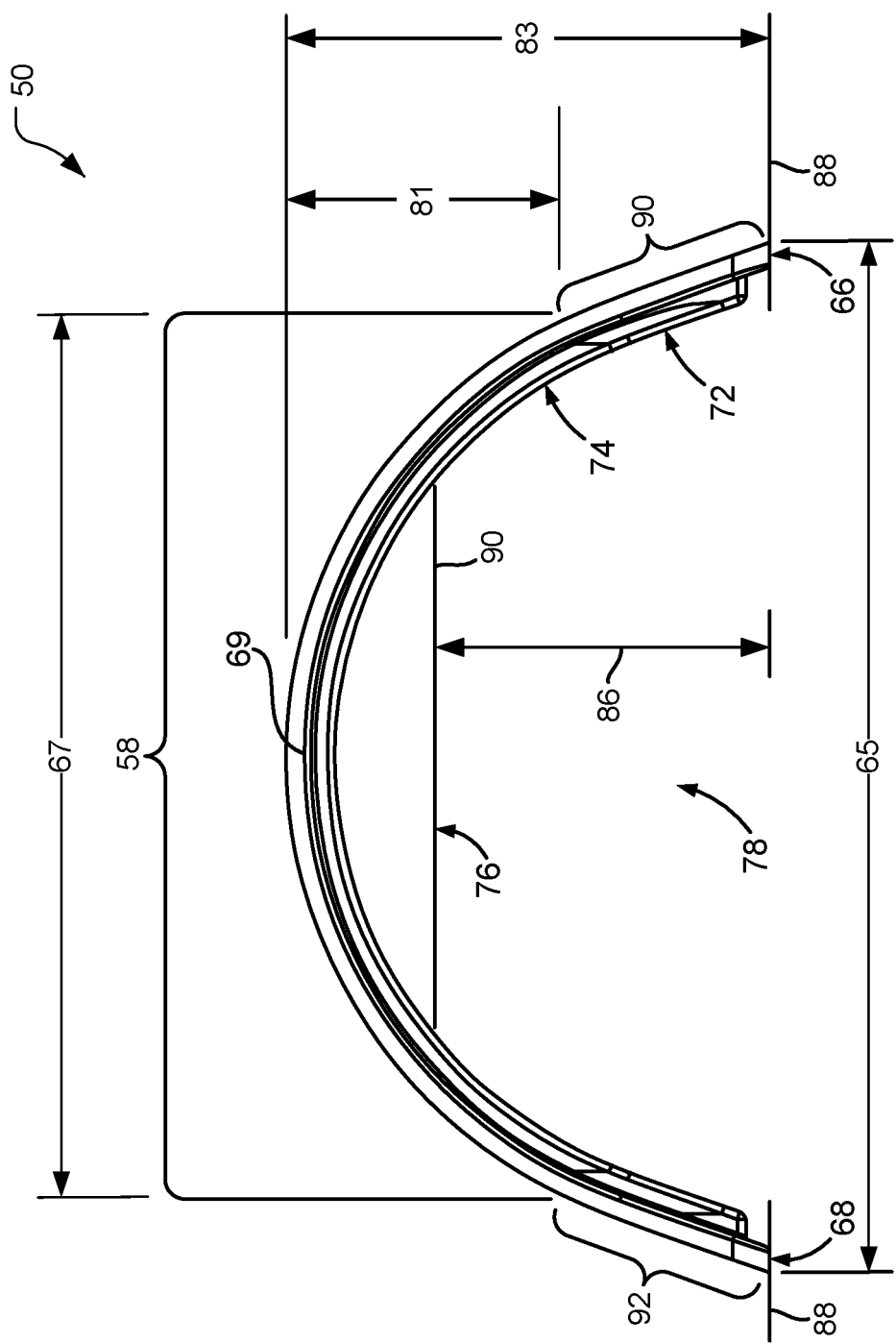
FIG. 4 is a side view of the hose support shown in FIG. 2.
Figure 5:
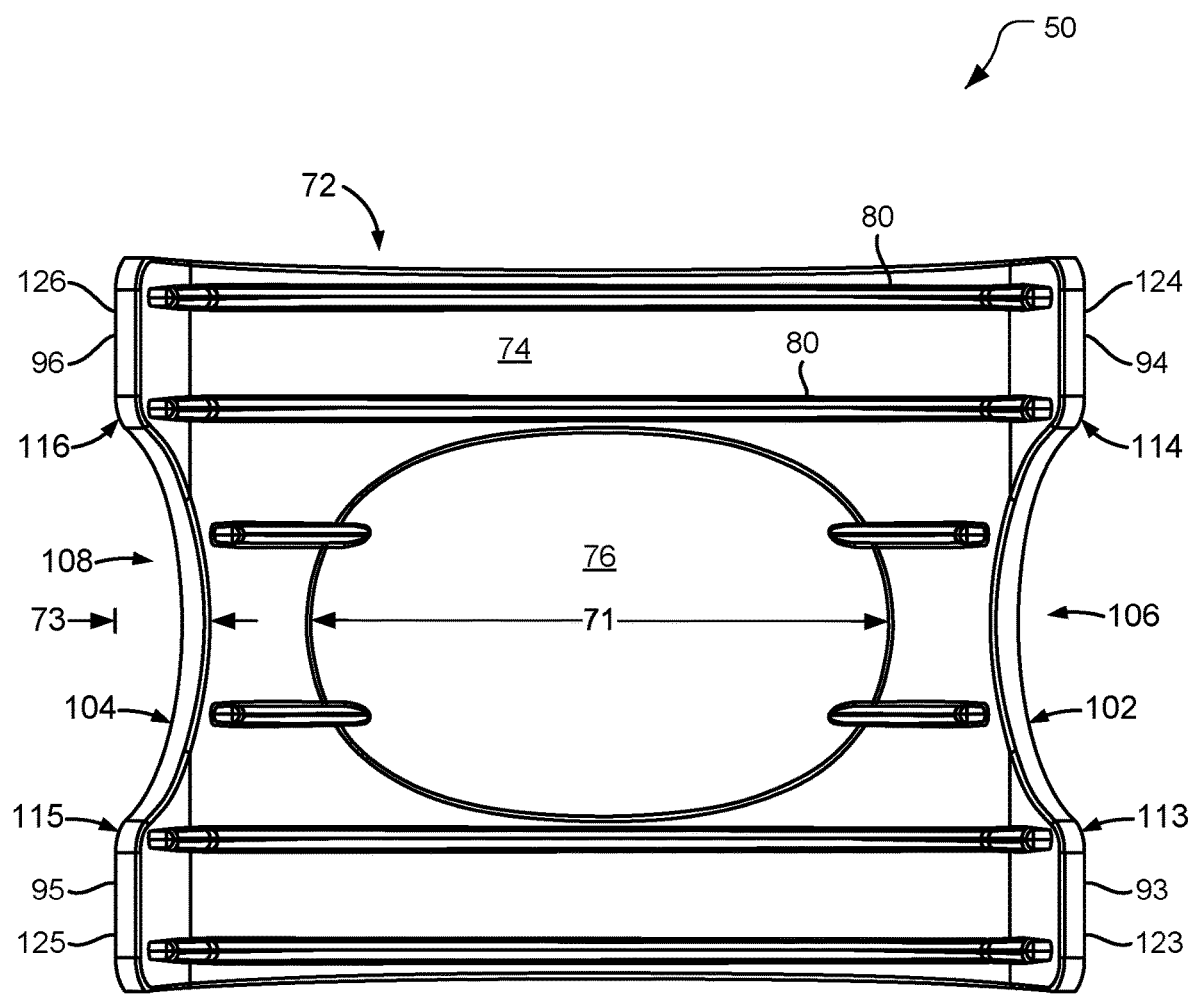
FIG. 5 is a bottom view of the hose support shown in FIG. 2.

With particular reference to FIGS. 2, 4, and 5, the midsection 58 is further configured with an inner surface 72 that includes a first inner surface portion 74 and a second inner surface portion 76. The first inner surface portion 74 is a concave surface while the inner surface portion 76 is a convex surface corresponding to the second outer surface portion 64. The inner surface portion 76 may be configured to be partially received by the recess 70 of another hose support 50. Together, the first inner surface portion 74 and the second inner surface portion 76 define a recess 78. The recess 78 is able to receive various items, or portions of items, such as a flange 82 of the hose 51 (see FIG. 7), or a small wall 84 (see FIG. 6) such as a wall bordering a garden, etc. The recess 78 may also receive a portion of a curb such that the hose support 50 may be used to support the hose 51 while extending from the street over a curb, or extending up or down stairs to help prevent the hose 51 from marring or otherwise damaging the stairs, in particular edges of the stairs. For example, a depth 86 of the recess 78 from a bottom plane 88 of the hose support 50 to a bottom 90 of the second inner surface 76 may be about 3.5 to about 4.0 inches. The first inner surface 74 includes stiffening members 80, here ribs, to increase the structural integrity and rigidity of the hose support 50. The shape of the inner surface 72 is an example, and other shapes may be used, e.g., to define a rectangular recess.

The midsection 58 connects to end sections 90, 92 comprising feet 93, 94, 95, 96. The end sections 90, 92 are shown as being flat sections, but the end sections 90, 92 may have other shapes such as curved shapes, e.g., continuing the curve of the midsection 58. The body 52 has concave surfaces 102, 104 (see FIG. 3), provided partially by the midsection 58 and partially by the respective end sections 90, 92, that define respective recesses 106, 108. The surfaces 102, 104 may be sized and shaped such that the recesses 106, 108 are sized and shaped similarly to the recess 70, or may be sized and shaped such that the recesses 106, 108 are sized and shaped differently than the recess 70. The recesses 106, 108 are between, and separate, respective ones of the feet 93-96, with the recess 106 separating the feet 93, 94 and the recess 108 separating the feet 95, 96. The feet 93-96 are portions of the body 52 separated by the recesses 106, 108 so that even if the recesses 106, 108 were defined entirely by the end sections 90, 92, the feet 93-96 would still be separated by the recesses 106, 108. The feet 93-96 have bottoms 123, 124, 125, 126 that are configured to rest on and possibly slide over the pavement. The bottoms 123-126 of the feet 93-96 are vertically displaced from the second outer surface portion 64 so that the second outer surface portion 64 can provide an upper support surface that can support the hose 51 above the pavement.

Figure 7:
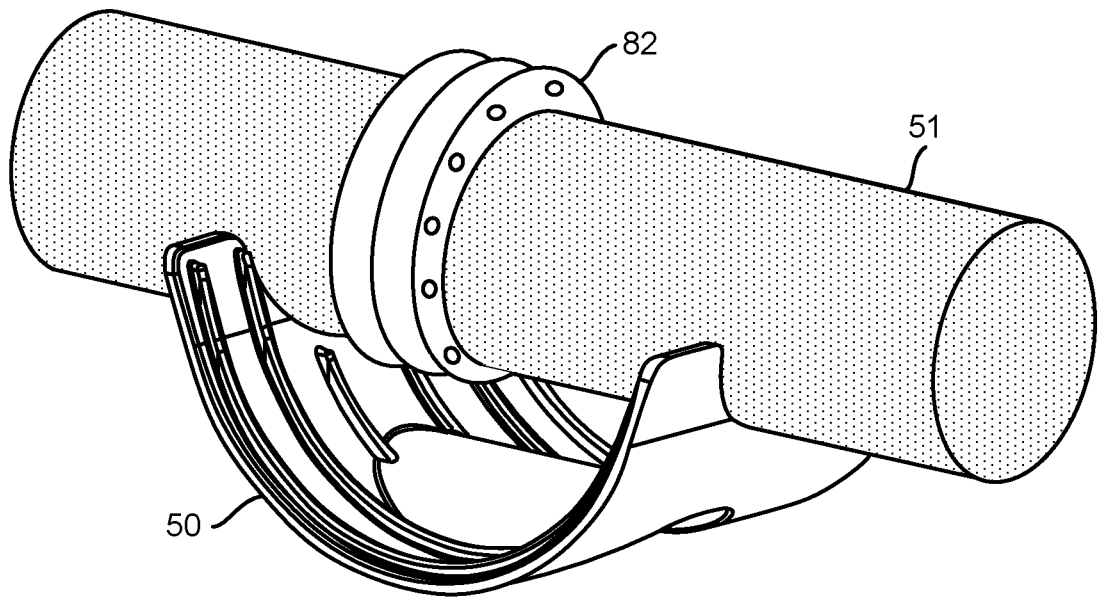
FIG. 7 is a perspective view of the hose support, shown in FIG. 2, in another orientation supporting a hose.

As with the second outer surface portion 64, the concave surfaces 102, 104 are configured to define the recesses 106, 108 to receive the hose 51 (see FIG. 7). The concave surfaces 102, 104 may slidably receive the hose 51, even if the concave surfaces 102, 104 are thin (e.g., knife edges). The concave surfaces 102, 104 may, however, be parallel to a bottom of the second outer surface portion 64 and transverse to the axis 63. The concave surfaces 102, 104 are configured, e.g., sized and shaped, to slidably receive the hose 51 while inhibiting lateral movement of the hose to help keep the hose 51 in the recesses 106, 108. For example, the concave surfaces 102, 104 may have shapes and sizes similar to a cross-sectional shape and size of the hose 51. Here, for example, each of the concave surfaces 102, 104 has a substantially arc shape, being circular or nearly circular in shape (e.g., an end view of the recesses 106, 108 being within ±10% of a single radius), but with flared end portions 113, 114, 115, 116. Circular portions of the concave surfaces 102, 104 may have slightly larger radii than a radius of the hose 51 to facilitate sliding of the hose 51 in the recesses 106, 108 while also retaining the hose 51 in the recesses 106, 108 to help the hose support 50 continue to support the hose 51 during use of the hose 51 to convey material. For example, the circular portions of the concave surfaces 102, 104 may each have a radius of 2.25 inches to receive the hose 51. The recesses 106, 108 may receive the hose 51 without receiving the entire hose 51, i.e., the recesses 106, 108 need not be as deep as the hose 51 is tall. As shown in FIG. 7, the recesses 106, 108 may receive about a fourth of a height of the hose 51. Further, the concave surfaces 102, 104 may each comprise a material and may have a smoothness such that a coefficient of friction permits sliding of the hose 51 relative to the concave surfaces 102, 104, e.g., with the hose support 50 (e.g., the outer surface 54) resting on pavement.

The body 52 is shaped and/or may comprise material configured to guard against damaging surfaces on which the hose support 50 is used to support the hose 51. The shape and/or the material of the body 52 may help the body slide against the pavement or other surface while guarding against damaging the pavement or other surface. The body 52 may be a monolithic piece, comprising a single material. Preferably, the body 52 comprises, or at least surfaces of the body 52 configured to rest on the pavement comprise, a material with a hardness that is softer than a hardness of concrete. For example, the body 52 may have a hardness between 2 and 7 (e.g., 2, 3, 4, 5, 6, or 7, or another, non-whole-number value) on the Moh's hardness scale. The hardness of the body 52 may be selected for a particular application, e.g., a hardness of the pavement with which the body 52 will be used. As an example of material of the body 52, the body 52 may comprise high-density polypropylene. Other materials, including more durable materials, may be used. For example, the body 52 may be made of metal, with the shape of the body 52 possibly helping to guard against damage to a surface on which the body 52 rests.

Figure 1:
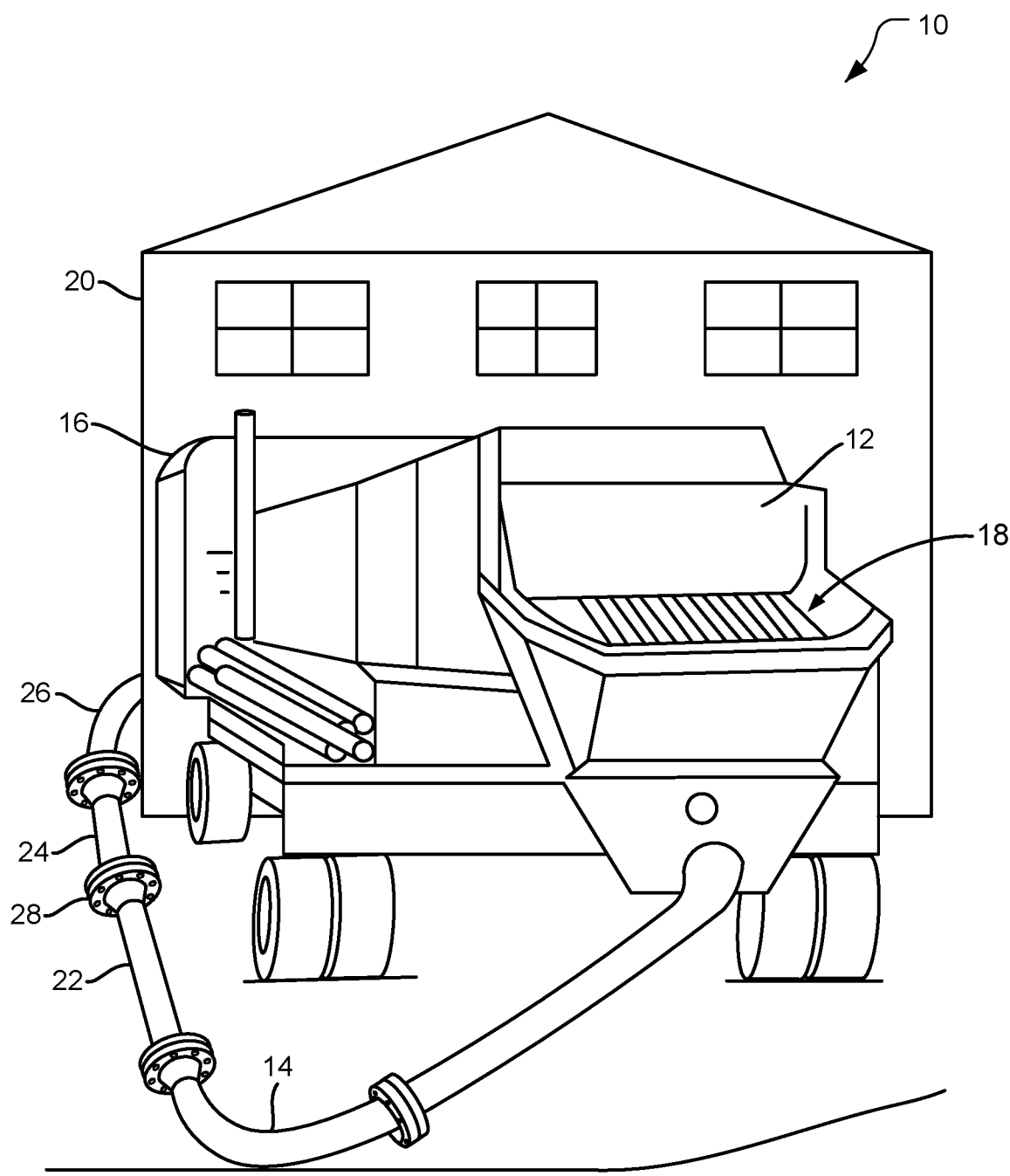
FIG. 1 is a perspective view of a concrete slurry delivery system.

In use, as shown in FIGS. 6-7, the hose support 50 may support the hose 51 above a surface such as pavement (e.g., concrete, asphalt, etc.). The hose support 50 can be positioned upright as shown in FIG. 6 and the hose 51 rested in the recess 70 against the second outer surface portion 64 to keep the hose 51 off the pavement (or other surface such as a lawn, rock garden, etc.). The hose support 50 may be positioned over an object between the line pump 12 (FIG. 1) and a location to which material is to be delivered by the hose 51 to help protect the object from damage from the hose 51. For example, the hose support 50 may be positioned to have the recess 78 receive a portion of a divider wall for a garden, a portion of a stair, a curb, etc. With the hose support 50 in the upright position, the hose 51 may slide in the recess 70 on the second outer surface portion 64 and/or the hose support 50 may slide on the pavement (or other surface). Multiple hose supports 50 may be used to raise long portions of the hose 51 above one or more surfaces to be protected between the line pump 12 and the location to receive the material (e.g., concrete slurry) delivered by the hose 51. As the hose 51 moves back and forth longitudinally (along the length of the hose 51), the hose supports 50 will roll and/or slide over the surface(s) on which the hose supports 50 rest. With the hose 51 separated from the surface(s), the surface(s) are protected from damage that may be caused by the hose 51 (possibly including one or more of the flanges 82) scraping across the surface(s).

Figure 8:
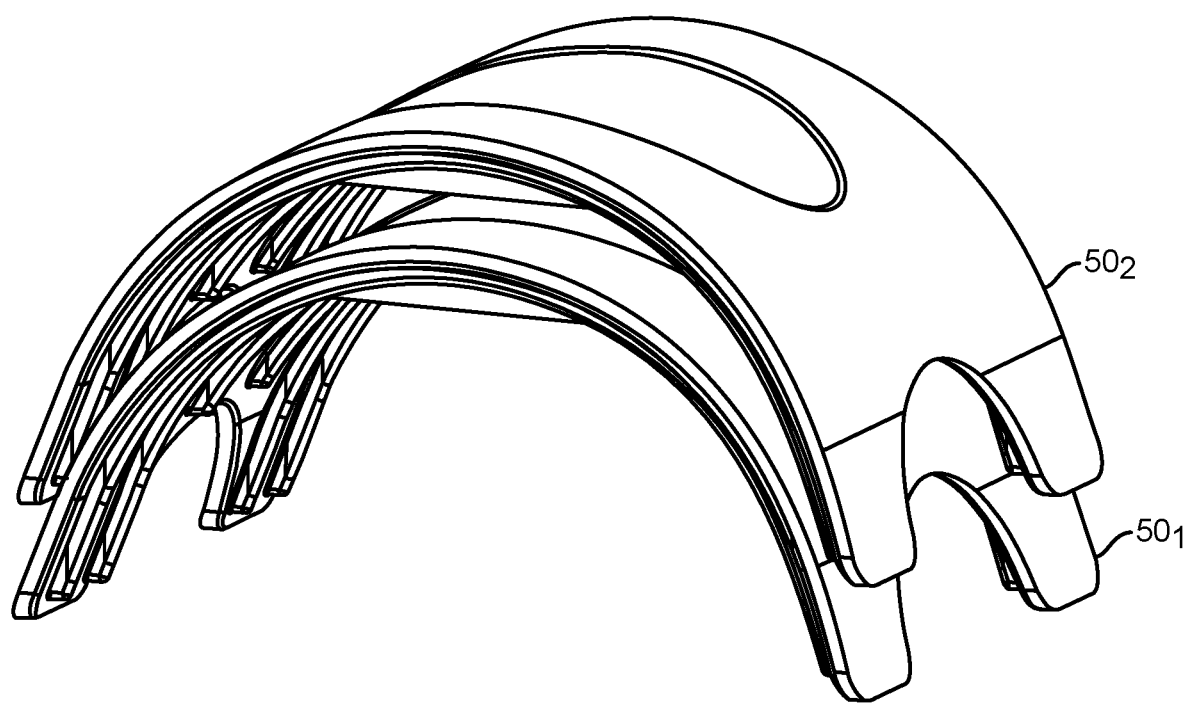
FIG. 8 is a perspective view of two hose supports stacked one on top of the other.

Referring to FIG. 8, with further reference to FIGS. 2 and 4, multiple hose supports 50$_1$, 50$_2$ may be stacked in a nested arrangement. The recess 78 of the hose support 50$_2$ partially receives the hose support 50$_1$, with the recess 70 of the hose support 50$_1$ partially receiving the second inner surface portion 76. Alternatively, the hose supports 50$_1$, 50$_2$ may be configured such that the recess 70 of the hose support 50$_1$ does not receive the second inner surface portion 76. Nesting of the hose supports 50$_1$, 50$_2$ may facilitate storage and/or packaging of the hose supports 50$_1$, 50$_2$ as the nested hose supports 50$_1$, 50$_2$ occupy less volume that the hose supports 50$_1$, 50$_2$ separately. As examples, packages of two, three, four, or more of the hose supports 50 may be used, e.g., sold. Further, mechanisms may be provided to help retain nested hose supports in a nested arrangement, e.g., to inhibit unintentional separation of the hose supports. For example, detents may be provided in the hose supports that engage when nested and resist separation of the hose supports. For example, each hose may have one or more indentations and one or more corresponding protrusions such that the protrusion(s) will enter the indentation(s) when nested and the protrusion(s) will interfere with surface(s) of the indentation(s) to inhibit separation of the hose supports.

The hose support 50 discussed above, including the variations discussed, is an example and numerous other examples of hose supports may use the teachings herein. For example, a hose support may be configured similarly to the hose support 50 but without the recess 70 or without the recesses 106, 108. As another example, a hose support may not have the recess 78 (i.e., the volume of the recess 78 would be occupied by the body of the hose support) except for a portion thereof to accommodate the hose 51 being received by the recesses 106, 108. As another example, a hose support may have side walls bordering the recess 78, which may increase rigidity of the hose support. The side walls could be angled outwardly from a top of the hose support toward a bottom of the hose support, e.g., to facilitate stacking/nesting of multiple hose supports. As yet other examples, instead of a midsection as rounded as the midsection 58, a hose support may have a less rounded midsection, or even a flat midsection with ends of the midsection shaped to facilitate sliding of the hose support on pavement (e.g., rounded ends).

Other Considerations

Other examples and implementations are within the scope and spirit of the disclosure and appended claims. For examples, where given, dimensions are examples and other dimensions may be used. Substantial variations may be made in accordance with specific requirements.

As used herein, an indication that a device is configured to perform a stated function means that the device contains appropriate equipment (e.g., with appropriate mechanical structure) to perform the stated function.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

The devices discussed above are examples. Various configurations may omit, substitute, alter, or add various components as appropriate. For instance, features described with respect to certain configurations may be combined in various other configurations. Different aspects and elements of the configurations may be combined in a similar manner.

Specific details are given in the description to provide a thorough understanding of example configurations (including implementations). However, configurations may be practiced without these specific details. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure. That is, having described several example configurations, various modifications, alternative constructions, and equivalents may be used without departing from the spirit of the disclosure. Accordingly, the above description does not bound the scope of the claims.

Further, more than one invention may be disclosed.

The invention claimed is:

1. An invertible concrete slurry hose support comprising:
   a body configured to receive and support a concrete slurry hose with the body in either an upright position or in an inverted position, the body comprising:
   a first end section disposed at a first end of the body and comprising a pair of first feet separated from each other along a width of the body;
   a second end section disposed at a second end of the body and comprising a pair of second feet separated from each other along the width of the body, the pair of first feet separated from the pair of second feet along a length of the body; and a midsection connecting the first end section to the second end section and including an outer surface that is a top surface in the upright position and that is a bottom surface in the inverted position, the top surface having an arched portion extending upwardly from each of the first end section and the second end section and extending a majority of the length of the body, the midsection including a first opening-defining portion that defines a first opening to receive the concrete slurry hose along a first portion of the length of the body with the body in the upright position, the first opening-defining portion of the top surface being shaped to inhibit movement of the concrete slurry hose along the width of the body with the concrete slurry hose received by the first opening;

wherein the body includes a second opening-defining portion that defines a second opening between the pair of second feet, and a third opening-defining portion that defines a third opening between the pair of first feet, the second opening-defining portion and the third opening-defining portion being disposed and configured to receive the concrete slurry hose along a second portion of the length of the body with the body in the inverted position, the second opening-defining portion being shaped to inhibit movement of the concrete slurry hose along the width of the body with the concrete slurry hose received by the second opening and the third opening-defining portion being shaped to inhibit movement of the concrete slurry hose along the width of the body with the concrete slurry hose received by the third opening;

wherein the first opening-defining portion can receive the concrete slurry hose in the upright position with the first feet and the second feet resting on a support surface, and the second opening-defining portion and the third opening-defining portion can receive the concrete slurry hose with the body in the inverted position and the bottom surface resting on the support surface; and wherein body is configured to have the bottom surface at least one of slide back and forth or slide back and forth relative to the support surface with the body in the inverted position and the concrete slurry hose received by the second opening-defining portion and the third opening-defining portion.

2. The invertible concrete slurry hose support of claim 1, wherein the body includes a plurality of stiffening members extending along a length of the body and increasing a thickness of the body along lengths of the stiffening members.

3. The invertible concrete slurry hose support of claim 1, wherein the first opening-defining portion comprises a portion of the outer surface to define the first opening as a first recess, the portion of the outer surface being configured to slidably receive the concrete slurry hose in the first recess.

4. The invertible concrete slurry hose support of claim 3, wherein a bottom of the first recess is parallel to a plane of bottoms of the first feet and the second feet.

5. The invertible concrete slurry hose support of claim 1, wherein the body comprises a material with a hardness that is softer than a hardness of concrete.

6. The invertible concrete slurry hose support of claim 5, wherein the body comprises high-density polypropylene.

7. The invertible concrete slurry hose support of claim 1, wherein the first opening-defining portion of the top surface includes a concave surface that defines a recess as the first opening, with the concave surface being configured to slidably receive the concrete slurry hose.

* * * * *